US011811206B1

(12) United States Patent
Sherriffs

(10) Patent No.: US 11,811,206 B1
(45) Date of Patent: Nov. 7, 2023

(54) CABLE PROTECTOR ASSEMBLIES AND RELATED METHODS AND SYSTEMS

(71) Applicant: FORUM US, INC., Houston, TX (US)

(72) Inventor: Donald Sherriffs, Richmond, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 17/941,820

(22) Filed: Sep. 9, 2022

(51) Int. Cl.
*H02G 3/08* (2006.01)
*H02G 3/04* (2006.01)

(52) U.S. Cl.
CPC .......... *H02G 3/088* (2013.01); *H02G 3/0481* (2013.01)

(58) Field of Classification Search
CPC .............................. H02G 3/088; H02G 3/0481
USPC ....................................................... 174/68.1
See application file for complete search history.

(56) References Cited

U.S. PATENT DOCUMENTS

| | | | | |
|---|---|---|---|---|
| 6,861,589 | B2 * | 3/2005 | Katsumata | E05D 11/0081 174/101 |
| 6,929,065 | B2 * | 8/2005 | Cannon | E21B 17/1035 166/241.7 |
| 7,134,455 | B2 * | 11/2006 | Hickman | F16L 59/022 138/155 |
| 8,444,445 | B2 | 5/2013 | Amidon et al. | |
| 8,851,165 | B2 | 10/2014 | Fielder et al. | |
| 8,955,598 | B2 | 2/2015 | Brown et al. | |
| 10,252,405 | B2 * | 4/2019 | Bartels | F16B 31/04 |
| 10,844,852 | B2 | 11/2020 | Robison et al. | |
| 2016/0325699 | A1 * | 11/2016 | Yoshida | B60R 16/0215 |

FOREIGN PATENT DOCUMENTS

KR 101767186 B1 8/2017

OTHER PUBLICATIONS

"Cross Coupling Cast Cable and Control Line Protector", Made-in-China, https://unibrom.en.made-in-china.com/productimage/eblmNKZdcOrS-2f1j00RsuTSpfdVYzr/China-Cross-Coupling-Cast-Cable-and-Control-Line-Protector.html.
"Cable Protectors (Casting)", Cenfirm, http://www.cenfirm.com/cable-protector/cable-protectors-casting.html.
"5 Intellectual property rights are successfully recognized", Oileader, http://www.oileader.com/main/news_detail.aspx?CID=15&ID=252.

* cited by examiner

*Primary Examiner* — Timothy J Thompson
*Assistant Examiner* — Michael F McAllister
(74) *Attorney, Agent, or Firm* — PATTERSON + SHERIDAN, L.L.P.

(57) ABSTRACT

Aspects of the present disclosure relate to cable protector assemblies, and related methods and systems. In one or more implementations, a cable protector assembly includes an adjustable latch. In one embodiment, which can be combined with other embodiments, a cable protector assembly includes a protective frame at least partially defining a channel. The channel is configured to at least partially receive a cable. The protective frame includes a frame flange having a section of a frame sheet formed into a first arcuate shape to define a frame opening. The cable protector assembly includes a collar segment pivotably coupled to the protective frame. The collar segment is pivotable between a disengaged position, an engaged position, and a biased position. The collar segment includes a collar flange having a section of a collar sheet formed into a second arcuate shape to define a collar opening.

20 Claims, 13 Drawing Sheets

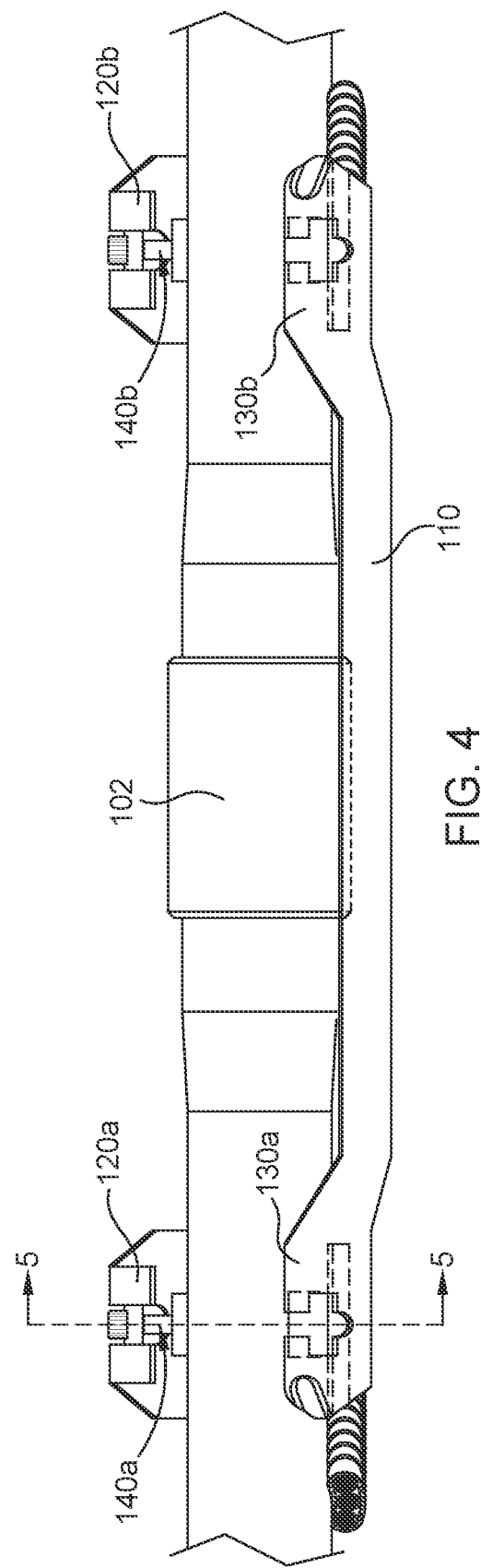

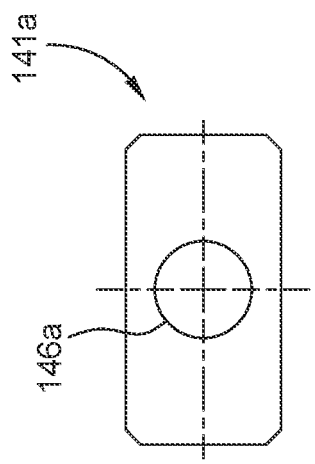
FIG. 9A
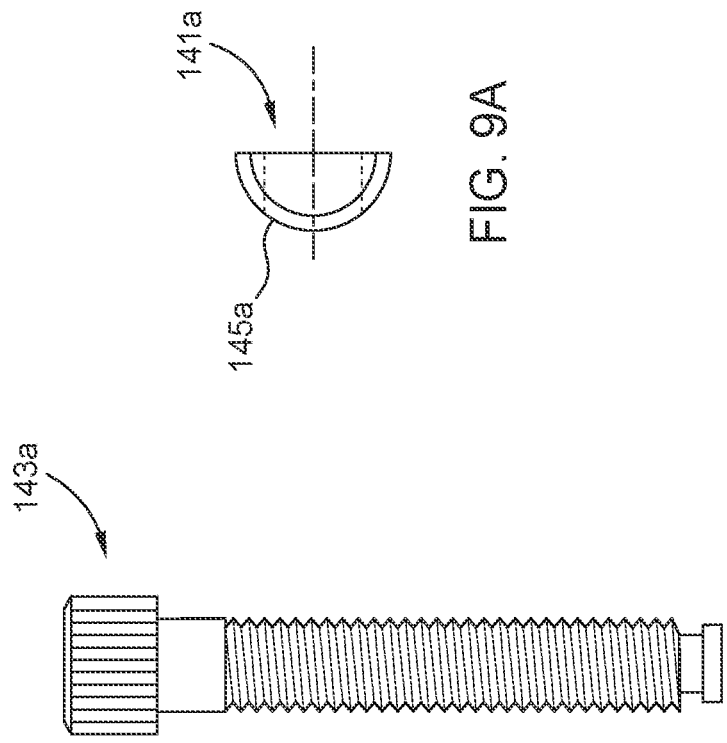
FIG. 9B
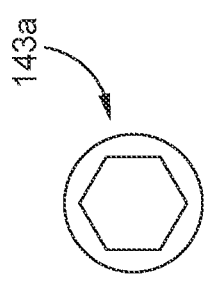
FIG. 8A
FIG. 8B

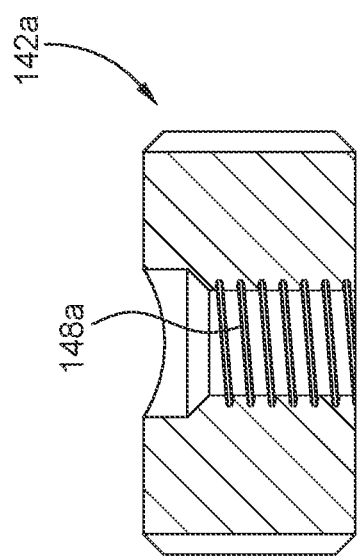
FIG. 10C
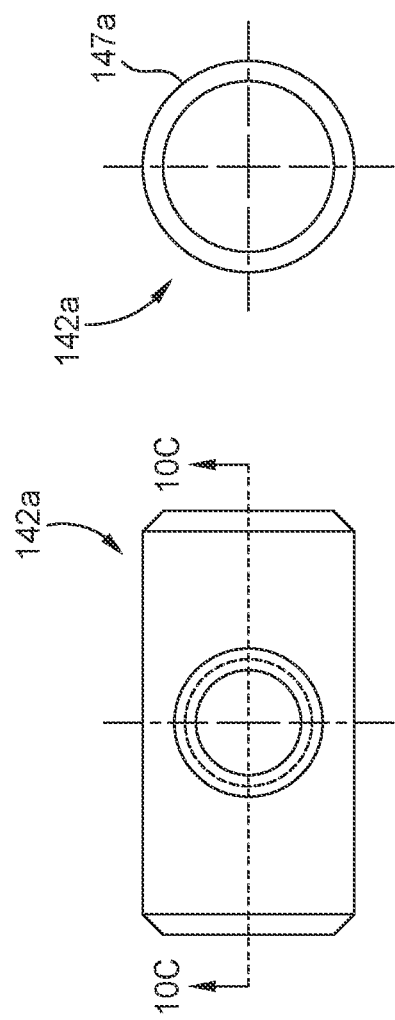
FIG. 10A
FIG. 10B
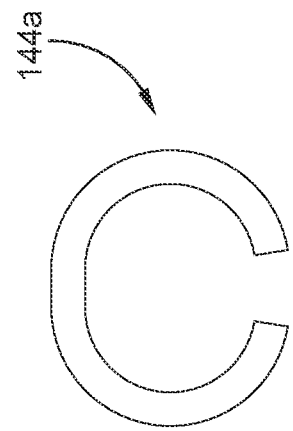
FIG. 11B
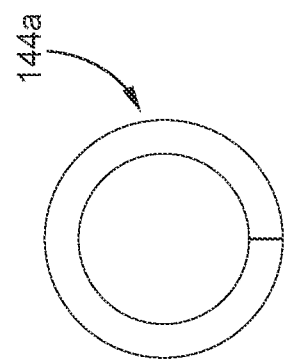
FIG. 11A

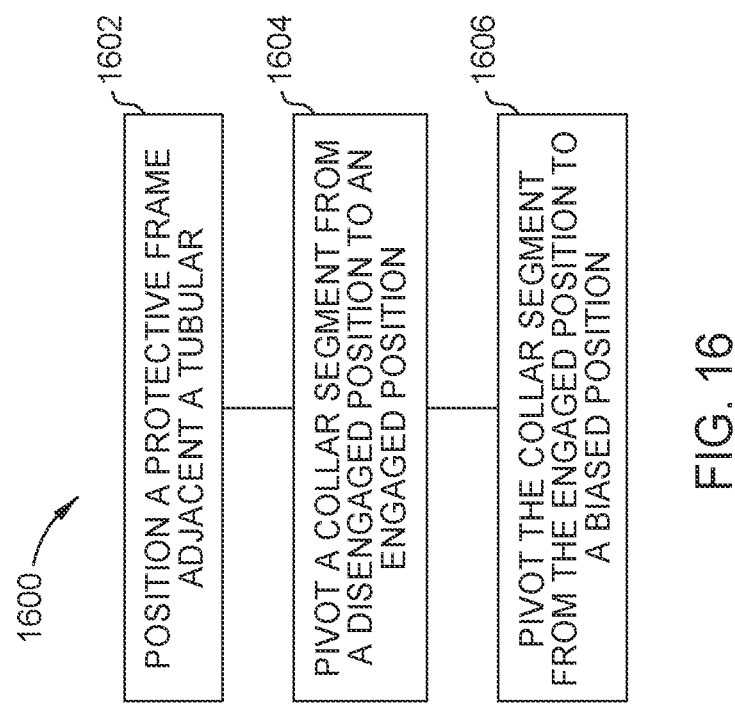
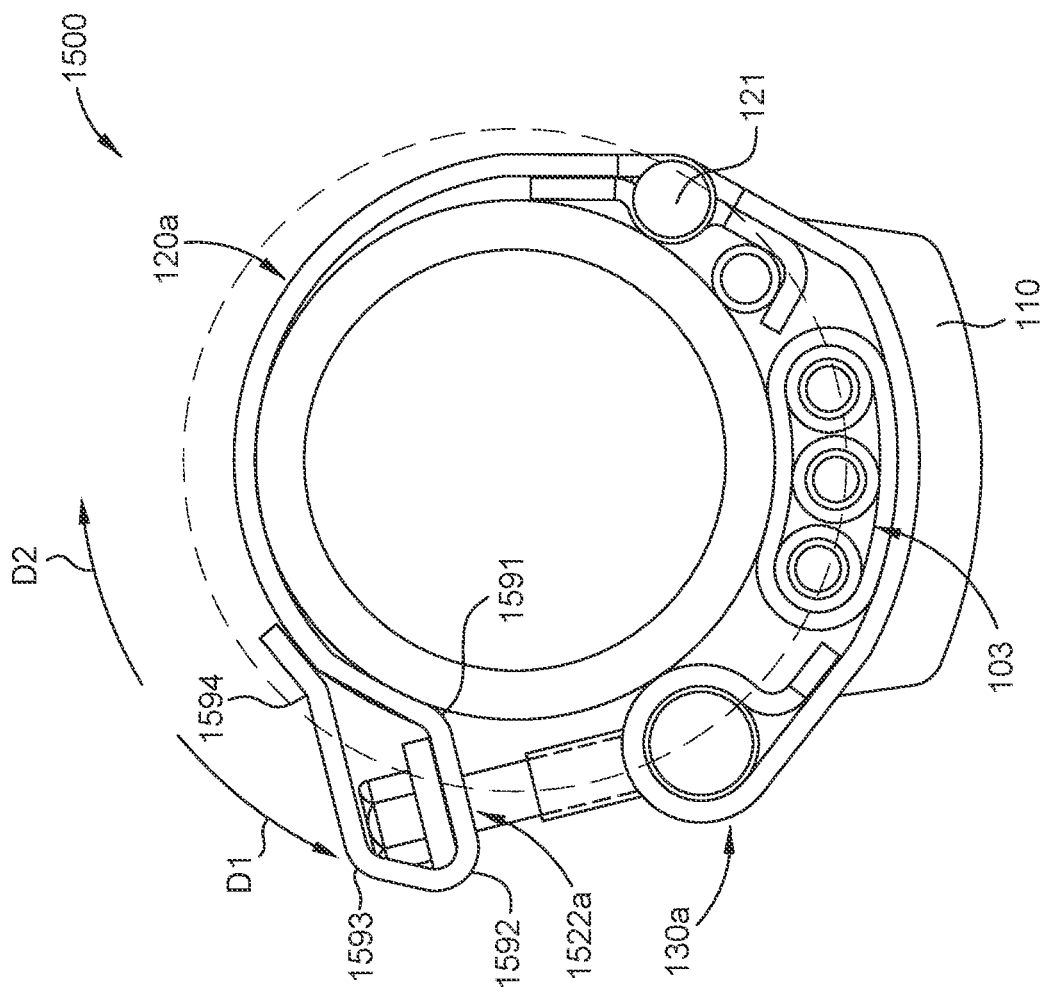

CABLE PROTECTOR ASSEMBLIES AND RELATED METHODS AND SYSTEMS

BACKGROUND

Field

Aspects of the present disclosure relate to cable protector assemblies, and related methods and systems. In one or more implementations, a cable protector assembly includes an adjustable latch.

Description of the Related Art

Cables that communicate with power electric submersible pumps can be damaged and/or moved when disposed downhole in a wellbore. For example, a cable section that is adjacent a changing outer diameter of a tubing string can be pressed between the tubing string and a casing of the wellbore, which can damage, move, and/or de-couple the cable. Attempts to protect cables can involve installation that is difficult, time-consuming, and costly. For example, installation efforts can involve specialized tools that are expensive, and/or can result in parts lost downhole.

Therefore, there is a need for cable protector assemblies, systems, and methods that facilitate reliable operation and installation that is simple, quick, and inexpensive.

SUMMARY

Aspects of the present disclosure relate to cable protector assemblies, and related methods and systems. In one or more implementations, a cable protector assembly includes an adjustable latch.

In one implementation, a cable protector assembly includes a protective frame at least partially defining a channel. The channel is configured to at least partially receive a cable. The protective frame includes a frame flange having a section of a frame sheet formed into a first arcuate shape to define a frame opening. The cable protector assembly includes a collar segment pivotably coupled to the protective frame. The collar segment is pivotable between a disengaged position, an engaged position, and a biased position. The collar segment includes a collar flange having a section of a collar sheet formed into a second arcuate shape to define a collar opening.

In one implementation, a cable protector assembly includes a protective frame at least partially defining a channel. The channel is configured to at least partially receive a cable. The protective frame includes a frame flange having a frame opening, an inner frame slot extending arcuately and at least partially about the frame opening, and an outer frame slot extending longitudinally and parallel to the frame opening. The inner frame slot intersects the outer frame slot. The cable protector assembly includes a collar segment pivotably coupled to the protective frame. The collar segment is pivotable between a disengaged position, an engaged position, and a biased position. The collar segment includes a collar flange having a collar opening.

In one implementation, a method of using a cable protector assembly includes positioning a protective frame adjacent a tubular. The positioning includes positioning at least part of a cable in a channel that is at least partially defined by the protective frame. The protective frame includes a frame flange having a frame opening, an inner frame slot extending arcuately and at least partially about the frame opening, and an outer frame slot extending longitudinally and parallel to the frame opening. The inner frame slot intersects the outer frame slot. The method includes pivoting a collar segment pivotably coupled to the protective frame from a disengaged position to an engaged position. The collar segment includes a collar flange having a collar opening. The pivoting includes rotating a first block disposed in the collar opening relative to the collar flange, passing a second block through the outer frame slot, and engaging an inner face of the frame flange with the second block.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a schematic partial side view of the first side of the cable protector assembly shown in FIG. 1 in a disengaged position, according to one implementation.

FIG. 8A is a schematic top view of the threaded fastener, according to one implementation.

FIG. 8B is a schematic side view of the threaded fastener shown in FIG. 8A, according to one implementation.

FIG. 9A is a schematic front view of the first block, according to one implementation.

FIG. 9B is a schematic side view of the first block shown in FIG. 9A, according to one implementation.

FIG. 10A is a schematic side view of the second block, according to one implementation.

FIG. 10B is a schematic front view of the second block shown in FIG. 10A, according to one implementation.

FIG. 10C is a schematic cross-sectional view of the second block shown in FIG. 10A, according to one implementation.

FIG. 11A is a schematic side view of the washer in a pressed configuration, according to one implementation.

FIG. 11B is a schematic side view of the washer shown in FIG. 11A in an initial configuration, according to one implementation.

FIG. 15 is a schematic cross-sectional view of a cable protector assembly, according to one implementation.

FIG. 16 is a schematic block diagram view of a method of using a cable protector assembly.

Figure 1:
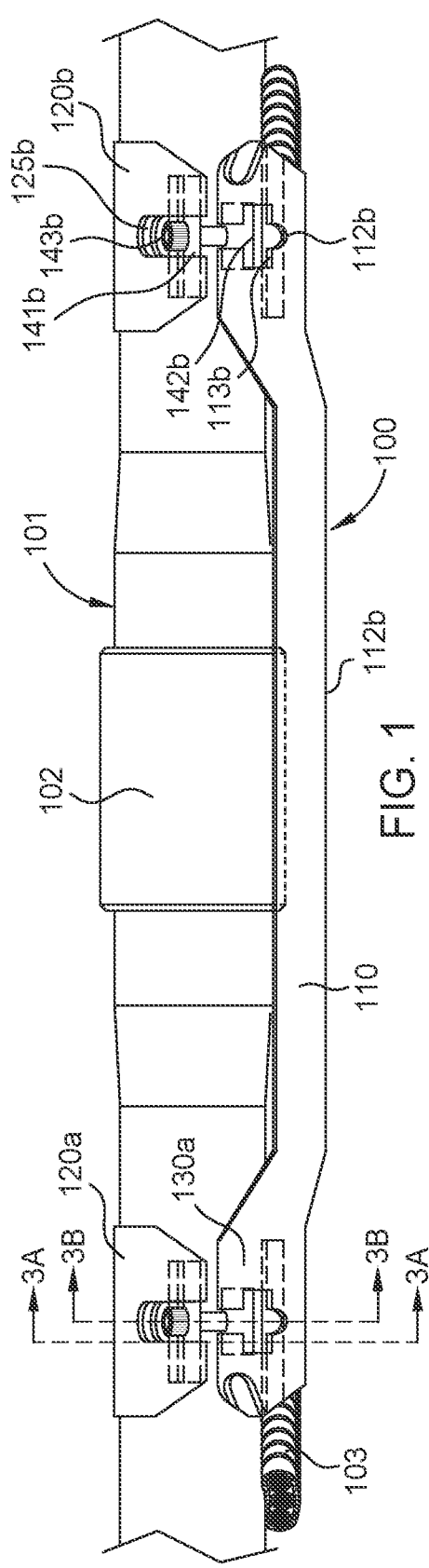
FIG. 1 is a schematic partial side view of a first side of a cable protector assembly installed on a tubing string in a biased position, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to cable protector assemblies, and related methods and systems. In one or more implementations, a cable protector assembly includes an adjustable latch.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

FIG. 1 is a schematic partial side view of a first side of a cable protector assembly 100 installed on a tubing string 101 in a biased position, according to one implementation.

Figure 2:
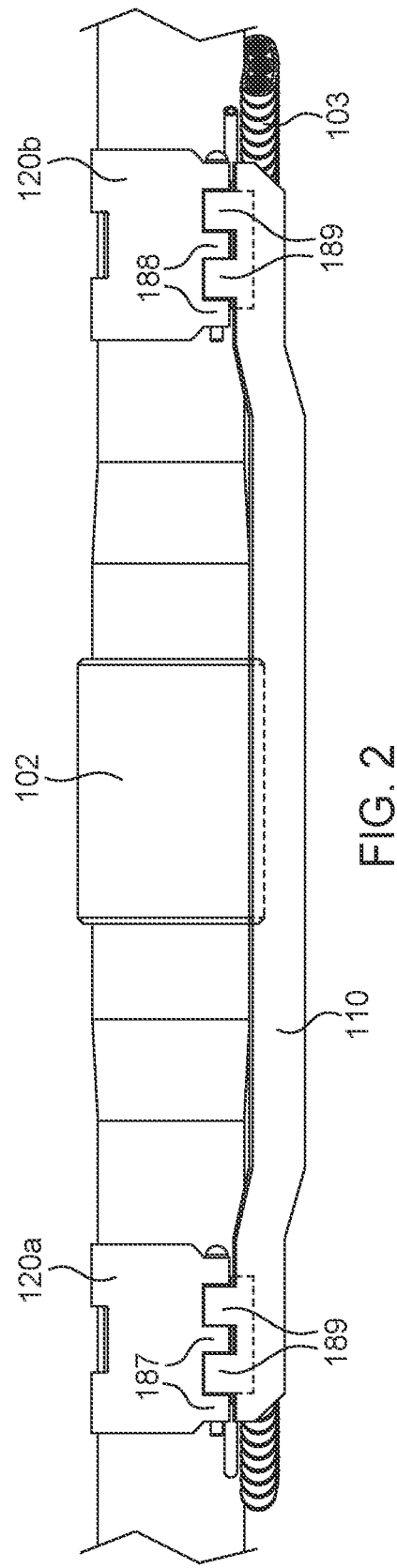
FIG. 2 is a schematic partial side view of a second side of the cable protector assembly shown in FIG. 1, according to one implementation.

FIG. 2 is a schematic partial side view of a second side of the cable protector assembly 100 shown in FIG. 1, according to one implementation.

The cable protector assembly 100 is disposed adjacent an enlarged outer diameter section 102 of the tubing string 101. In one or more embodiments, the tubing string 101 is a production tubing string. The enlarged outer diameter section 102, can be for example, a joint section of the tubing string 101 where a box end of a first tubular is joined to a pin end of a second tubular. The cable protector assembly 100 covers a section of a cable 103 that runs over the enlarged outer diameter section 102.

The cable protector assembly 100 includes a protective frame 110 and a collar segment 120a. The protective frame 110 includes a frame flange 130a. The protective frame 110 includes a second frame flange 130b spaced from the frame flange 130a. The cable protector assembly 100 includes a second collar segment 120b spaced form the collar segment 120a. Each frame flange 130a, 130b is adjacent an end of the protective frame 110. In one or more embodiments, each frame flange 130a 130b at least partially defines a respective end of the protective frame 110.

Figure 3A:
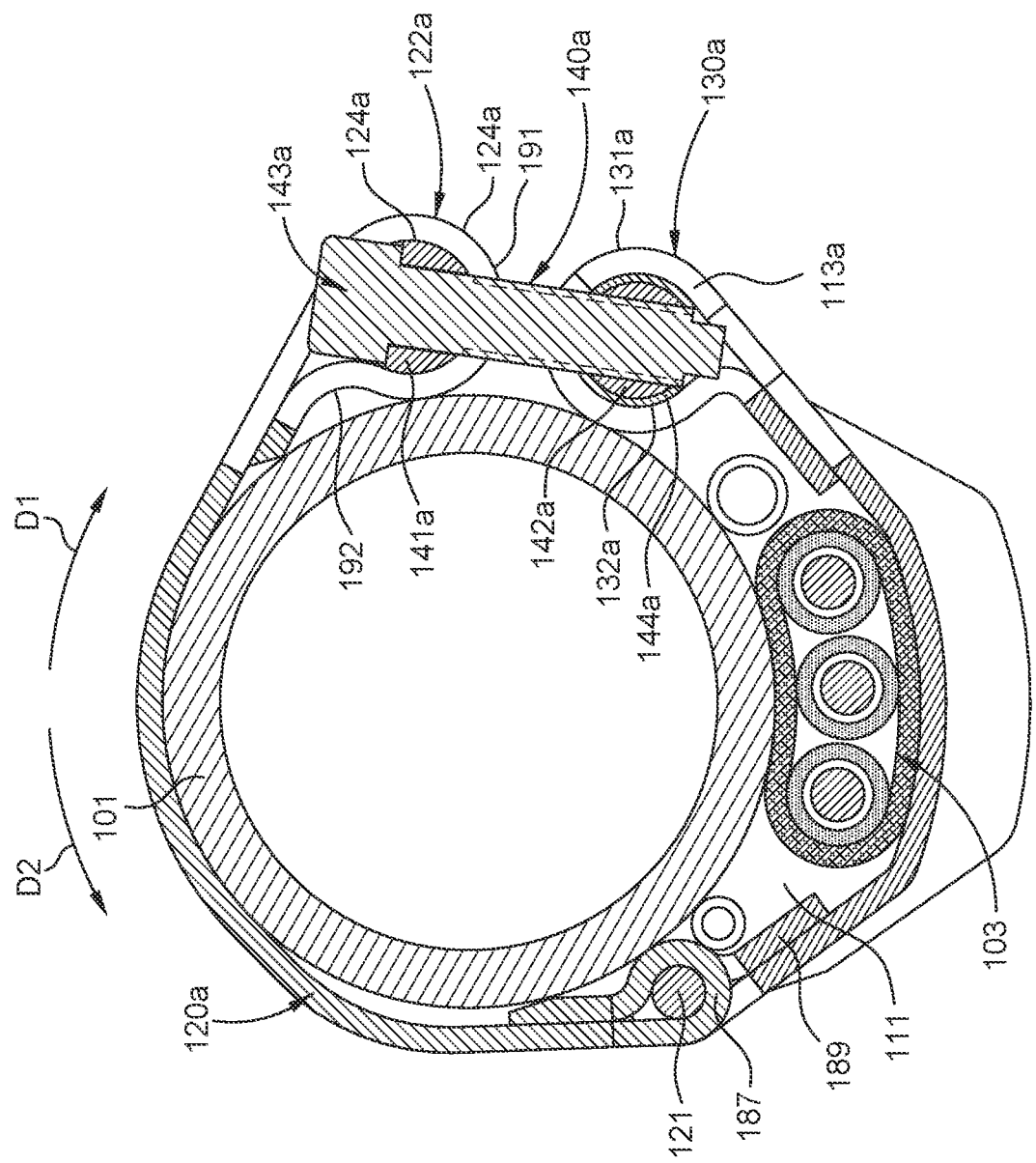
FIG. 3A is a schematic cross-sectional view of the cable protector assembly shown in FIGS. 1 and 2, according to one implementation.

FIG. 3A is a schematic cross-sectional view of the cable protector assembly 100 shown in FIGS. 1 and 2, according to one implementation. The section for FIG. 3A is taken along Section 3A-3A shown in FIG. 1.

Figure 3B:
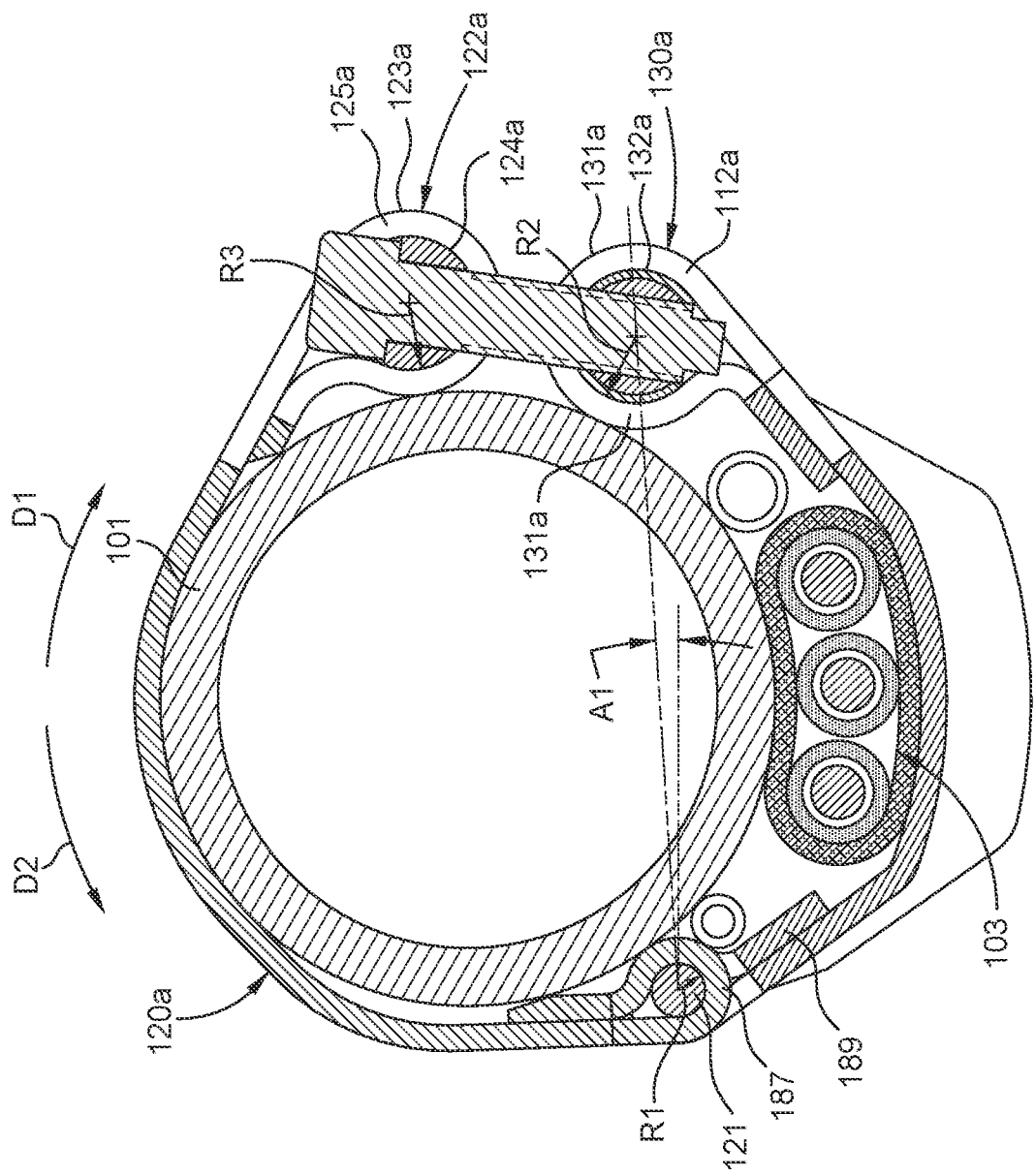
FIG. 3B is a schematic cross-sectional view of the cable protector assembly shown in FIGS. 1 and 2, according to one implementation.

FIG. 3B is a schematic cross-sectional view of the cable protector assembly 100 shown in FIGS. 1 and 2, according to one implementation. The section for FIG. 3B is taken along Section 3B-3B shown in FIG. 1.

The protective frame 110 at least partially defines a channel 111, and the channel 111 is configured to at least partially receive the cable 103. The frame flange 130a has a section 131a of a frame sheet formed into a first arcuate shape to define a frame opening 132a. The collar segment 120a is pivotably coupled to the protective frame 110 about one or more pivot pins 121. The collar segment 120a includes a collar flange 122a having a section 123a of a collar sheet formed into a second arcuate shape to define a collar opening 124a. Each of the frame flange 130a, the second frame flange 130b, and the protective frame 110 includes one or more pivot flanges 187, 188, 189 to facilitate pivoting the frame flange 130a and the second frame flange 130b relative to the protective frame 110.

In one or more embodiments, a geometric center of a pivot opening of each pivot flange 187 and pivot flange 189 is offset at an angle A1 relative to a geometric center of the frame opening 132a. The angle A1 is 6.0 degrees or higher, such as 6.1 degrees or 6.5 degrees. In one or more embodiments, the arcuate shapes of the pivot flanges 187, 188, 189 have a bend radius R1 that is 0.1 inches or greater, such as 0.13 inches. In one or more embodiments, the first and second arcuate shapes of the frame flanges 130a, 130b and the collar flanges 122a, 122b have a bend radius R2, R3 that is 0.3 inches or greater, such as 0.32 inches.

The collar flange 122a includes a collar slot 125a extending arcuately and at least partially about the collar opening 124a. In one or more embodiments, the collar slot 125a extends about an entirety of the collar opening 124a. The protective frame 110 includes an inner frame slot 112a extending arcuately and at least partially about the frame opening 132a, and an outer frame slot 113a extending longitudinally and parallel to the frame opening 132a. The inner frame slot 112a intersects the outer frame slot 113a, as shown in FIG. 1.

The cable protector assembly 100 includes an adjustable latch 140a. The adjustable latch 140a includes a first block 141a disposed in the collar opening 124a. The first block 141a is rotatable relative to the collar flange 122a. The adjustable latch 140a includes a threaded fastener 143a having a head and a rod. The rod of the threaded fastener 143a extends through the first block 141a. The adjustable latch 140a includes a second block 142a coupled to the threaded fastener 143a. The threaded fastener 143a is threaded at least partially into the second block 142a. In one or more embodiments, the threaded fastener 143a is a bolt. In one or more embodiments, the first block 141a is a barrel washer, and the second block 142a is a barrel nut. In such an embodiment, a washer 144a is disposed about the second block 142a. The present disclosure contemplates that the washer 144a could be omitted.

The washer 144a can include an opening through which the threaded fastener 143a is disposed. In one or more embodiments (such as the implementation shown in FIG. 3A), an outer face of the first block 141a is semi-cylindrical in shape. The outer face of the first block 141a can be cylindrical or polygonal in shape. In one or more embodiments (such as the implementation shown in FIG. 3A), an outer face of the second block 142a is cylindrical in shape. The outer face of the second block 142a can be semi-cylindrical or polygonal in shape. The outer frame slot 113a is sized and shaped to allow the second block 142a to pass therethrough.

The protective frame 110 (which includes the frame flanges 130a, 130b) is formed by stamping the frame sheet.

The collar segment 120*a* is formed by stamping the collar sheet, and the second collar segment 120*b* is formed by stamping a second collar sheet. In one or more embodiments, each of the frame sheet, the collar sheet, and the second collar sheet is formed of steel.

FIG. 4 is a schematic partial side view of the first side of the cable protector assembly 100 shown in FIG. 1 in a disengaged position, according to one implementation.

Figure 5:
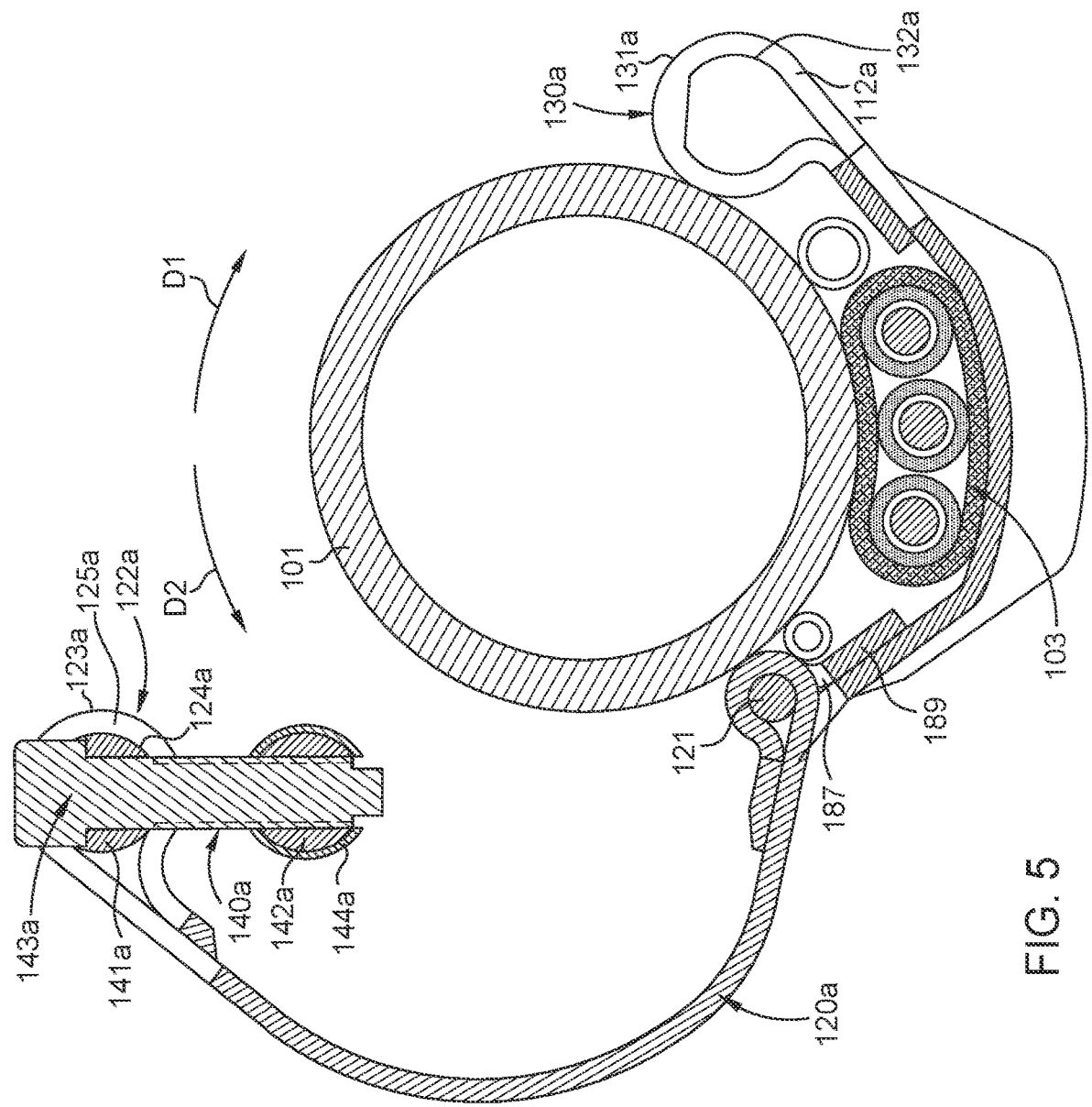
FIG. 5 is a schematic cross-sectional view of the cable protector assembly shown in FIG. 4, according to one implementation.

FIG. 5 is a schematic cross-sectional view of the cable protector assembly 100 shown in FIG. 4, according to one implementation. The section for FIG. 5 is taken along Section 5-5 shown in FIG. 4.

In the disengaged position, the collar segments 120*a*, 120*b* are pivoted away from the frame flanges 130*a*, 130*b*, and the adjustable latches 140*a*, 140*b* are suspended from the collar segments 120*a*, 120*b*. In the disengaged position the second blocks 142*a*, 142*b* are disposed outside of the frame openings 132*a*, 132*b*.

Figure 6:
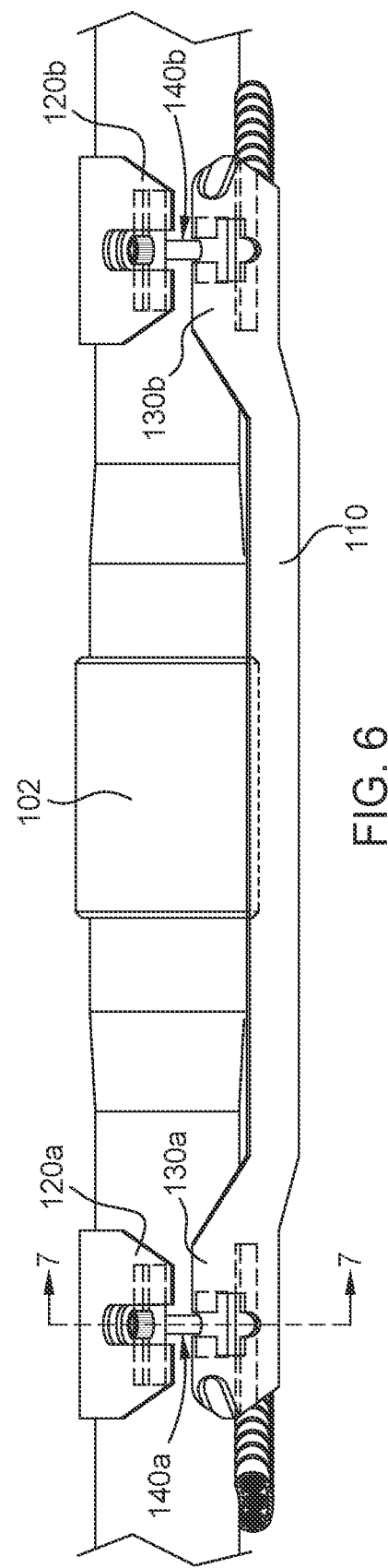
FIG. 6 is a schematic partial side view of the first side of the cable protector assembly shown in FIG. 1 in an engaged position, according to one implementation.

FIG. 6 is a schematic partial side view of the first side of the cable protector assembly 100 shown in FIG. 1 in an engaged position, according to one implementation.

Figure 7:
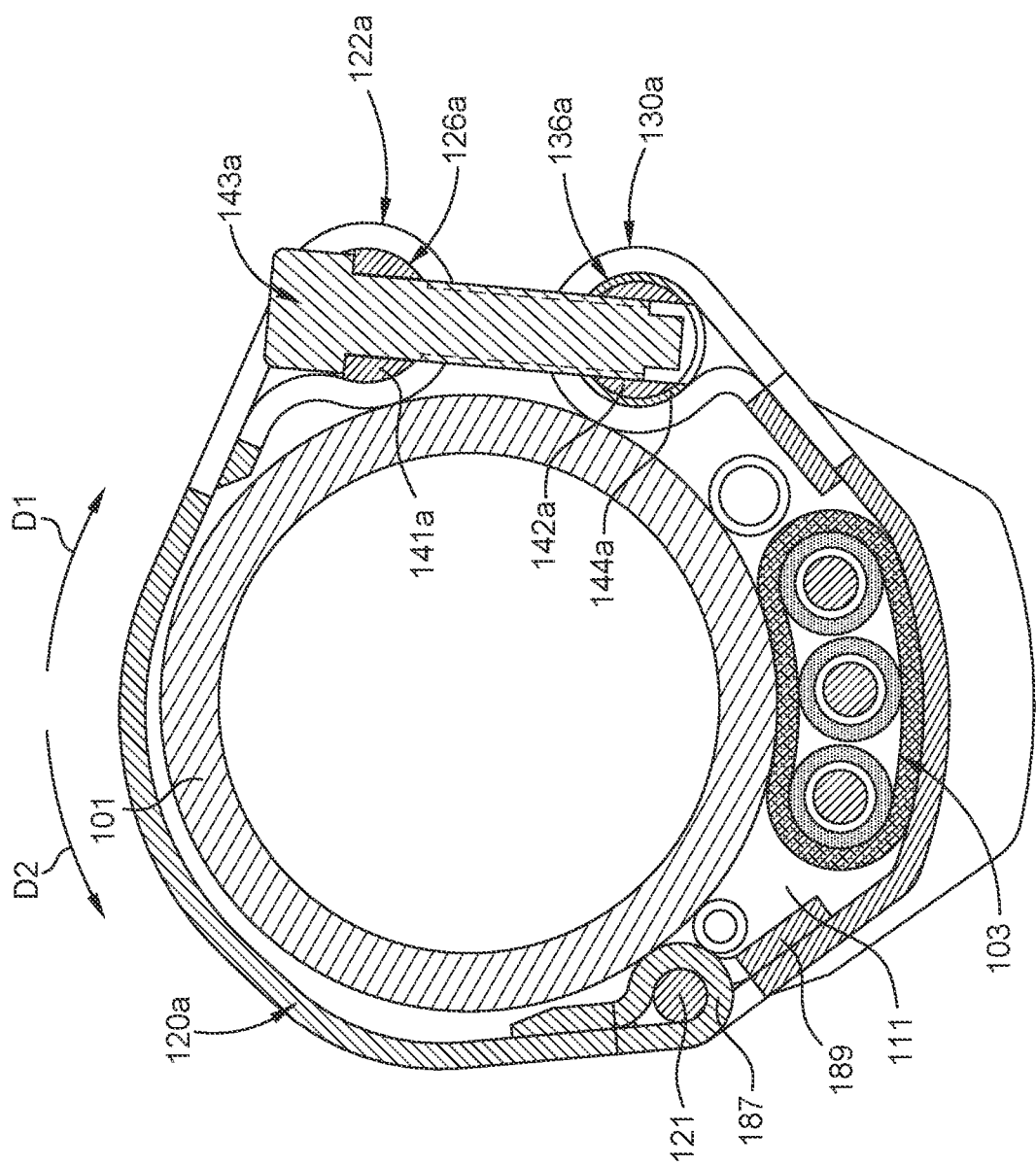
FIG. 7 is a schematic cross-sectional view of the cable protector assembly shown in FIG. 6, according to one implementation.

FIG. 7 is a schematic cross-sectional view of the cable protector assembly 100 shown in FIG. 6, according to one implementation. The section for FIG. 7 is taken along Section 7-7 shown in FIG. 6.

In the engaged position, the second block 142*a* of the adjustable latch 140*a* is disposed in the frame opening 132*a*. The adjustable 140*a* can be used manually to bias the cable protector assembly from the engaged position (shown in FIG. 7) to the biased position (shown in FIGS. 3A and 3B) by turning the head of the threaded fastener 143*a* to further thread the threaded fastener 143*a* into the second block 142*a*. In the biased position, the second block 142*a* is biased against an inner face 133*a* of the frame flange 130*a* (such as through the washer 144*a*) by turning the head of the threaded fastener 143*a*. The first block 141*a* is biased against an inner face 126*a* of the collar segment 120*a*, which biases the collar segment 120*a* to pivot the collar segment 120*a* toward the frame flange 130*a*. The inner face 133*a* of the frame flange 130*a* has the first arcuate shape, and the inner face 126*a* of the collar segment 120*a* has the second arcuate shape.

The collar segments 120*a*, 120*b* are pivotable between the disengaged position, the engaged position, and the biased position. The present disclosure contemplates that the two collar segments 120*a*, 120*b* can be pivoted and/or biased simultaneously, and/or can be pivoted and/or biased independently of each other.

FIG. 8A is a schematic top view of the threaded fastener 143*a*, according to one implementation. FIG. 8B is a schematic side view of the threaded fastener 143*a* shown in FIG. 8A, according to one implementation. The head of the threaded fastened includes a hex-shaped interface for interfacing with a tool (such as a screwdriver or a wrench) for manual driving of the head.

FIG. 9A is a schematic front view of the first block 141*a*, according to one implementation. FIG. 9B is a schematic side view of the first block 141*a* shown in FIG. 9A, according to one implementation. In the implementation shown, an outer face 145*a* of the first block 141*a* is semi-cylindrical in shape. The first block 141*a* includes an opening 146*a* through which the rod of the threaded fastener 143*a* is disposed.

FIG. 10A is a schematic side view of the second block 142*a*, according to one implementation. FIG. 10B is a schematic front view of the second block 142*a* shown in FIG. 10A, according to one implementation. FIG. 10C is a schematic cross-sectional view of the second block 142*a* shown in FIG. 10A, according to one implementation. The cross-sectional view is taken along Section 10C-10C shown in FIG. 10A. In the implementation shown, an outer face 147*a* of the second block 142*a* is cylindrical in shape. The second block 142*a* includes a threaded opening 148*a*. The rod of the threaded fastener 143*a* threaded at least partially into the threaded opening 148*a*.

FIG. 11A is a schematic side view of the washer 144*a* in a pressed configuration, according to one implementation. In the pressed configuration, the washer 144*a* surrounds the second block 142*a*.

FIG. 11B is a schematic side view of the washer 144*a* shown in FIG. 11A in an initial configuration, according to one implementation.

Figure 12:
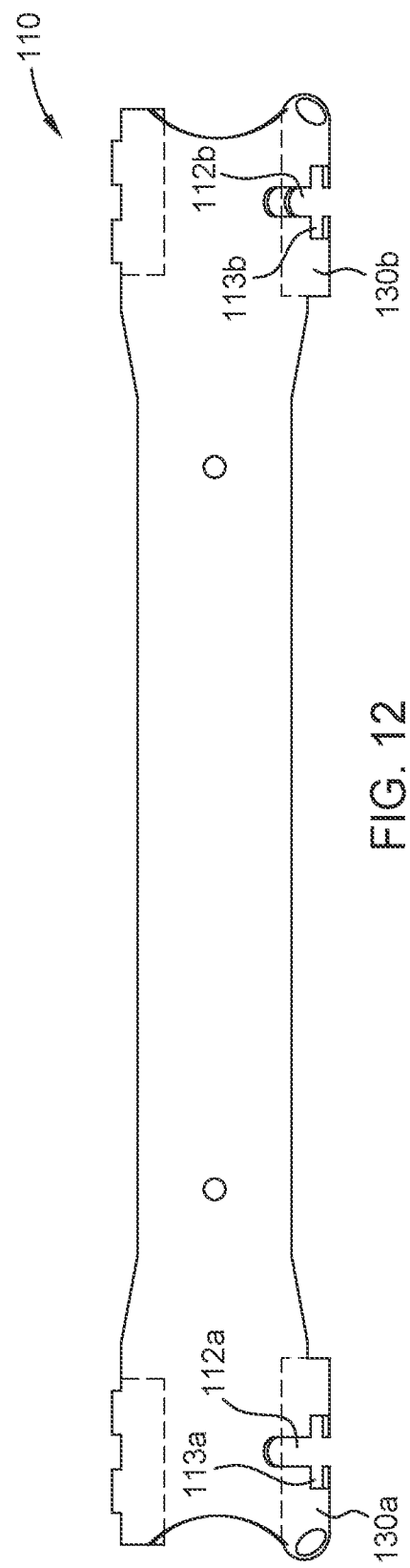
FIG. 12 is a schematic top view of the protective frame shown in FIGS. 1, 3A, and 3B, according to one implementation.

FIG. 12 is a schematic top view of the protective frame 110 shown in FIGS. 1, 3A, and 3B, according to one implementation.

Figure 13:
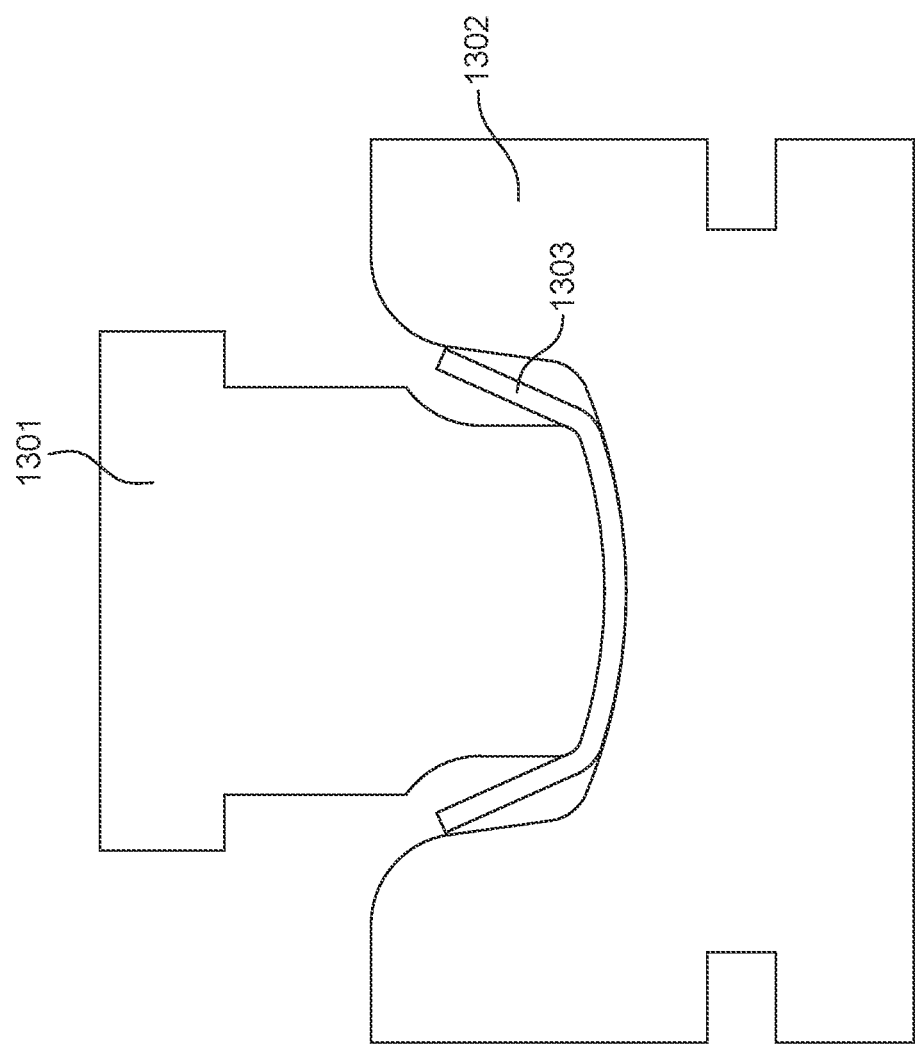
FIG. 13 is a schematic view of a stamping operation, according to one implementation.

FIG. 13 is a schematic view of a stamping operation, according to one implementation. In the stamping operation, a stamp die 1301 and a stamp holder 1302 are used to stamp a sheet of metal 1303 into a stamped shape. As an example, the stamped shape may define at least part of the channel 111. One or more additional stamp dies and stamp holders 1302 of various shapes may then be used to stamp the sheet of metal 1303 into the shape of the protective frame 110 shown in FIGS. 1, 3A, and 3*b*.

Figure 14:
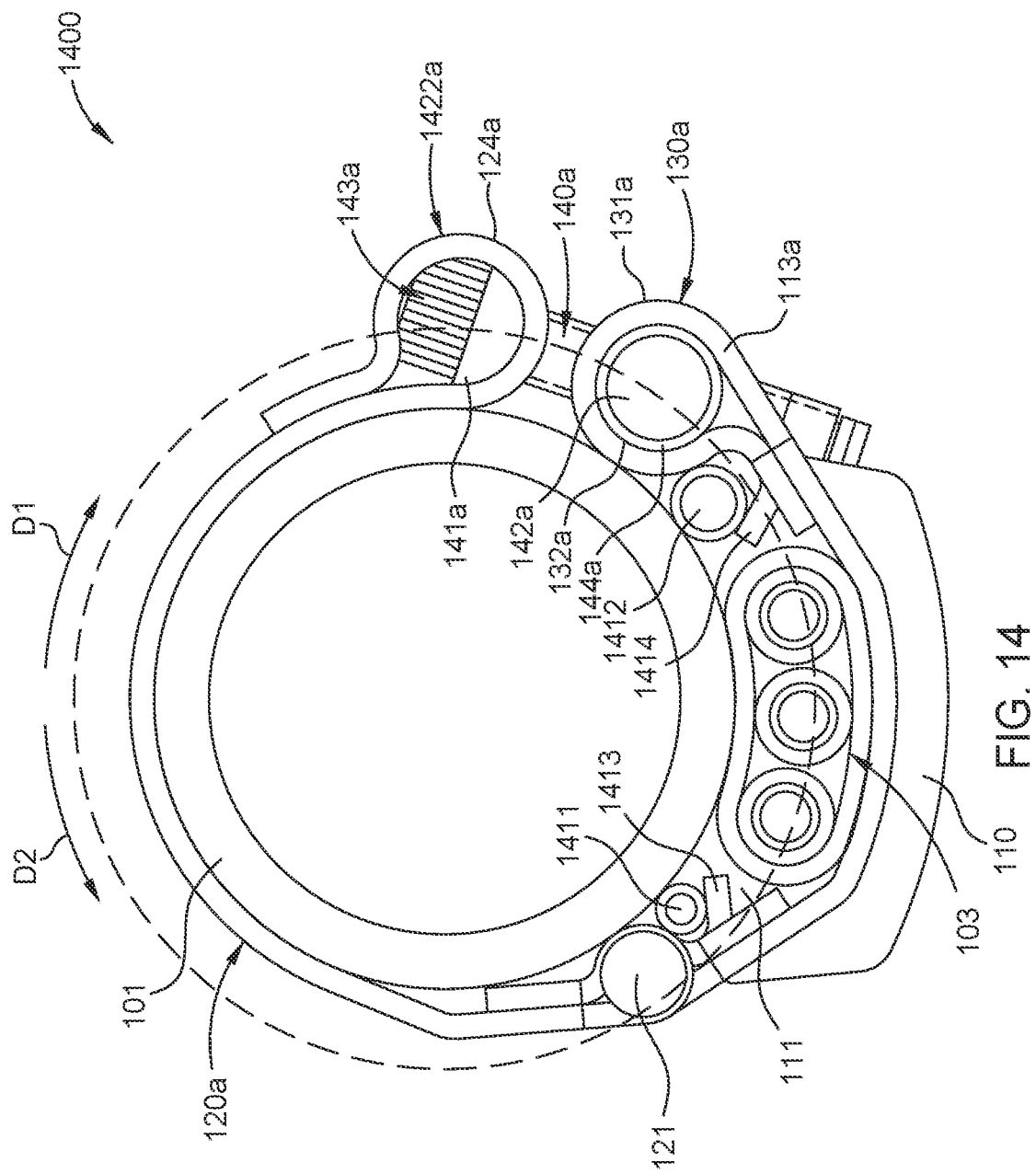
FIG. 14 is a schematic cross-sectional view of a cable protector assembly, according to one implementation.

FIG. 14 is a schematic cross-sectional view of a cable protector assembly 1400, according to one implementation. Hatching is not shown in FIG. 14 for clarity purposes. The cable protector assembly 1400 is similar to the cable protector assembly 100 shown in FIG. 3A, and includes one or more of the aspects, features components, operations, and/or properties thereof. In the implementation of the cable protector assembly 100 shown in FIG. 3A, the collar flange 122*a* and the frame flange 130*a* are both curved (e.g., bent) inwardly towards the tubing string 101. The present disclosure contemplates that one or more of the collar flange 122*a* and/or the frame flange 130*a* can be curved (e.g., bent) outwardly away from the tubing string 101. In the implementation of the cable protector assembly 1400 shown in FIG. 14, the frame flange 130*a* is curved inwardly and a collar flange 1422*a* is curved outwardly.

Bare lines 1411, 1412 (e.g., capillaries) are at least partially covered with flanges 1413, 1414. The flanges 1413, 1414 can be formed from the piece of sheet metal used to form the protective frame 110, or the flanges 1413, 1414 can be plates that are coupled (such as welded) to the protective frame 110.

FIG. 15 is a schematic cross-sectional view of a cable protector assembly 1500, according to one implementation. Hatching is not shown in FIG. 15 for clarity purposes. The cable protector assembly 1500 is similar to the cable protector assembly 100 shown in FIG. 3A, and includes one or more of the aspects, features components, operations, and/or properties thereof. The cable protector assembly 1500 is similar to the cable protector assembly 1400 shown in FIG. 14, and includes one or more of the aspects, features components, operations, and/or properties thereof.

In the implementation of the cable protector assembly 1500 shown in FIG. 15, a collar flange 1522*a* has an arcuate shape that differs from the first arcuate shape shown in FIG. 3A. In FIG. 3A, the first arcuate shape of the collar flange 122*a* has a first bend 191 and a second bend 192. In FIG. 15, the arcuate shape of the collar flange 1522*a* has four bends 1591-1594.

FIG. 16 is a schematic block diagram view of a method 1600 of using a cable protector assembly.

Operation 1602 of the method 1600 includes positioning a protective frame adjacent a tubular. The positioning includes positioning at least part of a cable in a channel that is at least partially defined by the protective frame. The protective frame includes a frame flange having a frame opening, an inner frame slot extending arcuately and partially about the frame opening, and an outer frame slot extending longitudinally and parallel to the frame opening. The inner frame slot intersects the outer frame slot.

Operation 1604 includes pivoting a collar segment pivotably coupled to the protective frame from a disengaged position to an engaged position. The collar segment includes a collar flange having a collar opening. The pivoting includes rotating a first block disposed in the collar opening relative to the collar flange, passing a second block through the outer frame slot, and engaging an inner face of the frame flange with the second block. The collar segment pivots in a first direction D1 (shown for example in FIG. 3A) to pass the second block through the outer frame slot, and the collar segment pivots in a second direction D2 (shown for example in FIG. 3A) to engage the inner face with the second block. The second direction D2 is opposite of the first direction D1.

Operation 1606 includes pivoting the collar segment from the engaged position to a biased position. The collar segment pivots in the first direction D1 to the biased position. The pivoting of the collar segment to the biased position includes turning a head of a threaded fastener to bias the second block against the inner face. A rod of the threaded fastener extends through the first block, and the rod is threaded at least partially into the second block. The turning of the head further threads the rod into the second block.

Benefits of the present disclosure include compactness of protection assemblies (such as reduced lead-in profiles and reduced running outer diameters); increased annular wellbore flow; reduced weight; reduced installation times; increased holding forces on tubulars of tubing strings and cables; larger impact protection and reduced or eliminated chances of component fracturing for protection assemblies; modularity in applications for tubing strings (such as multiple styles of tubular connections); and modularity in applications for cable designs (such as for use to cover multiple cables and/or multiple different cable orientations). Such benefits are facilitated, for example, by the frame flange and the collar flange having arcuate shapes, and/or the components being formed by stamping steel sheets.

Benefits of the present disclosure also include a contained design with reduced or eliminated loose parts at the time of installation; reduced or eliminated chances of dropping parts (e.g., downhole); simplicity in installation (e.g., the use of simple tools such as hex wrenches or screwdrivers); reduced installation times and installation costs; unidirectional installation to reduce or eliminate installation errors; left-sided or right-sided line configurations; reduced vibration exposure of protection assemblies during installation; reduced or eliminated spark generation during installation; reduced or eliminated failure of assembly components (such as the adjustable latch); increased holding forces on tubulars of tubing strings and cables (e.g., facilitated by increased contact surface areas with the protection assemblies); and modularity in applications for tubing strings and cable designs. Such benefits are facilitated, for example, by the frame flange, the collar flange, the adjustable latch, the collar slot, and/or the inner and outer frame slots.

As an example, the adjustable latches being suspended from the collar flanges in the disengaged position facilitates reduced or eliminated chances of dropping parts (e.g., downhole). As another example, the use of the threaded fastener facilitates easily and simply installing the cable protector assembly (e.g., using a hex wrench) to reduce or eliminate damage (e.g., crushing) of cables between an enlarged diameter and a wellbore casing.

It is contemplated that one or more of the aspects disclosed herein may be combined. Moreover, it is contemplated that one or more of these aspects may include some or all of the aforementioned benefits. For example, the present disclosure contemplates that one or more aspects, features, components, operations, and/or properties of the cable protector assembly 100, the disengaged position, the engaged position, the biased position, the collar segment 120*a*, the second collar segment 120*b*, the first block 141*a*, the second block 142*a*, the threaded fastener 143*a*, the washer 144*a*, the protective frame 110, the stamping operations (as shown, for example, in FIG. 13), the cable protector assembly 1400, the cable protector assembly 1500, and/or the method 1600 may be combined.

The present disclosure contemplates that the subject matter described in relation to frame flange 130*a*, the collar segment 120*a*, and the sections of the protective frame 110 adjacent the frame flange 130*a* can be implemented identically for the second frame flange 130, the second collar segment 120*b*, and second sections of the protective frame 110 that are adjacent the second frame flange 130*b*. As an example, a second adjustable latch 140*b* can include a first block 141*b*, a second block 142*b*, and a threaded fastener 143*b* that are identical—respectively—to the first block 141*a*, the second block 142*a*, and the threaded fastener 143*a* of the adjustable latch 140*a*.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

I claim:

1. A cable protector assembly, comprising:
  a protective frame at least partially defining a channel, the channel configured to at least partially receive a cable, the protective frame comprising:
    a frame flange having a section of a frame sheet formed into a first arcuate shape to define a frame opening; and
  a collar segment pivotably coupled to the protective frame, the collar segment pivotable between a disengaged position, an engaged position, and a biased position, the collar segment comprising:
    a collar flange having a section of a collar sheet formed into a second arcuate shape to define a collar opening.

2. The cable protector assembly of claim 1, wherein the collar flange further comprises:
  a collar slot extending arcuately and at least partially about the collar opening.

3. The cable protector assembly of claim 2, wherein the protective frame further comprises:
  an inner frame slot extending arcuately and at least partially about the frame opening; and an outer frame slot extending longitudinally and parallel to the frame opening, wherein the inner frame slot intersects the outer frame slot.

4. The cable protector assembly of claim 3, further comprising an adjustable latch, the adjustable latch comprising:
a first block disposed in the collar opening and rotatable relative to the collar flange;
a threaded fastener comprising a head and a rod, the rod extending through the first block; and
a second block coupled to the threaded fastener, wherein the threaded fastener is threaded at least partially into the second block.

5. The cable protector assembly of claim 4, wherein an outer face of the first block is semi-cylindrical in shape, and an outer face of the second block is cylindrical in shape.

6. The cable protector assembly of claim 5, wherein the first block is a barrel washer, and the second block is a barrel nut.

7. The cable protector assembly of claim 4, wherein the outer frame slot is sized and shaped to allow the second block to pass therethrough.

8. The cable protector assembly of claim 7, wherein in the disengaged position the second block is disposed outside of the frame opening, in the engaged position the second block is disposed in the frame opening, and in the biased position the second block is biased against an inner face of the frame flange by turning the head of the threaded fastener.

9. The cable protector assembly of claim 8, wherein the inner face of the frame flange has the first arcuate shape.

10. The cable protector assembly of claim 1, wherein the frame flange is adjacent an end of the protective frame.

11. The cable protector assembly of claim 1, wherein the protective frame is formed by stamping the frame sheet, and the collar segment is formed by stamping the collar sheet.

12. The cable protector assembly of claim 1, the protective frame further comprises:
a second frame flange spaced from the frame flange, the second frame flange having a second section of the frame sheet formed into the first arcuate shape to define a second frame opening.

13. The cable protector assembly of claim 12, further comprising:
a second collar segment pivotably coupled to the protective frame, the second collar segment comprising:
a second collar flange having a section of a second collar sheet formed into the second arcuate shape to define a second collar opening.

14. A cable protector assembly, comprising:
a protective frame at least partially defining a channel, the channel configured to at least partially receive a cable, the protective frame comprising:
a frame flange having a frame opening,
an inner frame slot extending arcuately and at least partially about the frame opening, and
an outer frame slot extending longitudinally and parallel to the frame opening, wherein the inner frame slot intersects the outer frame slot; and
a collar segment pivotably coupled to the protective frame, the collar segment pivotable between a disengaged position, an engaged position, and a biased position, the collar segment comprising:
a collar flange having a collar opening.

15. The cable protector assembly of claim 14, wherein the collar flange further comprises:
a collar slot extending arcuately and at least partially about the collar opening.

16. A method of using a cable protector assembly, comprising:
positioning a protective frame adjacent a tubular, the positioning comprising positioning at least part of a cable in a channel that is at least partially defined by the protective frame, the protective frame comprising:
a frame flange having a frame opening,
an inner frame slot extending arcuately and at least partially about the frame opening, and
an outer frame slot extending longitudinally and parallel to the frame opening, wherein the inner frame slot intersects the outer frame slot; and
pivoting a collar segment pivotably coupled to the protective frame from a disengaged position to an engaged position, the collar segment comprising a collar flange having a collar opening, the pivoting comprising:
rotating a first block disposed in the collar opening relative to the collar flange,
passing a second block through the outer frame slot, and
engaging an inner face of the frame flange with the second block.

17. The method of claim 16, wherein:
the collar segment pivots in a first direction to pass the second block through the outer frame slot; and
the collar segment pivots in a second direction to engage the inner face with the second block, and the second direction is opposite of the first direction.

18. The method of claim 17, further comprising:
pivoting the collar segment from the engaged position to a biased position.

19. The method of claim 18, wherein the pivoting of the collar segment to the biased position comprising turning a head of a threaded fastener to bias the second block against the inner face.

20. The method of claim 19, wherein a rod of the threaded fastener extends through the first block, and the rod is threaded at least partially into the second block.

* * * * *